United States Patent [19]
Shimohira et al.

[11] Patent Number: 5,264,100
[45] Date of Patent: Nov. 23, 1993

[54] FLUORINE-CONTAINING CATION EXCHANGE MEMBRANE FOR ELECTROLYSIS HAVING A PROTRUDING POROUS BASE REINFORCING MATERIAL ON ONE SIDE THEREOF

[75] Inventors: Tetsuji Shimohira; Yoshiaki Higuchi; Yoshihiko Saitoh, all of Yokohama, Japan

[73] Assignee: Asahi Glass Company Ltd., Tokyo, Japan

[21] Appl. No.: 856,744

[22] Filed: Mar. 24, 1992

[30] Foreign Application Priority Data

Apr. 5, 1991 [JP] Japan ................................ 3-100344

[51] Int. Cl.$^5$ ..................... C25B 13/02; C25B 13/08
[52] U.S. Cl. ....................................... 204/296; 521/27
[58] Field of Search ............................ 204/296; 521/27

[56] References Cited

U.S. PATENT DOCUMENTS

| | | | |
|---|---|---|---|
| 4,913,817 | 4/1990 | Tsushima et al. | 204/296 |
| 4,990,228 | 5/1991 | Perusich et al. | 204/296 |
| 5,149,403 | 9/1992 | Shimohira et al. | 204/296 |

FOREIGN PATENT DOCUMENTS

| | | |
|---|---|---|
| 0094587 | 11/1983 | European Pat. Off. |
| 0165466 | 12/1985 | European Pat. Off. |
| 0192261 | 8/1986 | European Pat. Off. |
| 0253119 | 2/1988 | European Pat. Off. |
| 0305155 | 3/1989 | European Pat. Off. |
| 0409344 | 1/1991 | European Pat. Off. |

*Primary Examiner*—Kathryn Gorgos
*Attorney, Agent, or Firm*—Oblon, Spivak, McClelland, Maier & Neustadt

[57] ABSTRACT

A fluorine-containing cation exchange membrane for electrolysis, which comprises a first layer of a fluorine-containing polymer having cation exchange groups and reinforced with a porous base material and a second layer of a fluorine-containing polymer having carboxylic acid groups, present on the cathode side of the first layer, wherein at least ½ of the thickness of the porous base material protrudes from the first layer towards the anode side, the protrusions of the porous base material are covered with a coating layer of a fluorine-containing polymer having cation exchange groups so that the coating layer is integrated with the first layer, and the anode side surface of the coating layer has a roughness corresponding to the surface contour of the porous base material.

10 Claims, 1 Drawing Sheet

FLUORINE-CONTAINING CATION EXCHANGE MEMBRANE FOR ELECTROLYSIS HAVING A PROTRUDING POROUS BASE REINFORCING MATERIAL ON ONE SIDE THEREOF

FIELD OF THE INVENTION

The present invention relates to a fluorine-containing cation exchange membrane for electrolysis. More particularly, it relates to a fluorine-containing cation exchange membrane for electrolysis, which has high mechanical strength (especially against a bending force during its use) and excellent electrochemical properties i.e. low electric resistance and high current efficiency and which thus makes it possible to conduct electrolysis under a high current density or a shift operation where the current density is substantially varied.

BACKGROUND OF THE INVENTION

Fluorine-containing cation exchange membranes are widely used or proposed to be used as ion exchange membranes for electrolysis to produce an alkali metal hydroxide and chlorine or as diaphragms for water electrolysis, hydrochloric acid electrolysis or electrolysis for recovery of valuable metals, by virtue of their excellent heat resistance, chemical resistance and mechanical resistance. When a fluorine-containing ion exchange membrane is practically used for electrolysis, it is common to incorporate into the membrane a porous base material such as a woven fabric made of a fluorine-containing polymer such as polytetrafluoroethylene (PTFE) as a reinforcing material and thereby to support the membrane (e.g. Japanese Unexamined Patent Publications No. 56192/1978, No. 37186/1983 and No. 37187/1983).

However, with such a reinforced fluorine-containing ion exchange membrane, the fluorine-containing polymer such as PTFE used as the reinforcing material, is likely to shield permeation of ions (flow of electric current), whereby the membrane electric resistance tends to increase.

It is effective to reduce the thickness of the fluorine-containing polymer having ion exchange groups for the purpose of reducing the membrane resistance. However, such an attempt usually leads to a problem that the strength, particularly the bending strength, deteriorates due to the notch effect derived from the contour of yarns constituting the woven fabric. Namely, the resistance against bending corresponds to the cube of the film thickness. Therefore, an ion exchange membrane made of a thin film tends to be inadequate, particularly in the bending strength. There has been no practically useful low electric resistance membrane having a small thickness. Fluorine-containing polymer membranes having ion exchange groups and reinforced by woven fabrics, which are commercially available for practical use, have a thickness of at least 150 µm, as measured by a weight method.

SUMMARY OF THE INVENTION

It is an object of the present invention to provide a fluorine-containing cation exchange membrane for electrolysis, which has an extremely thin film thickness and accordingly low electric resistance, while it is a cation exchange membrane having high mechanical strength, particularly high bending strength, which has been hardly accomplished by conventional techniques.

Another object of the present invention is to provide a fluorine-containing cation exchange membrane for electrolysis which has high mechanical strength and excellent electrochemical properties, whereby electrolysis under a high current density or current shift operation wherein the current density is substantially varied, can be conducted.

The present invention has been made to accomplish the above objects and provides a fluorine-containing cation exchange membrane for electrolysis, which comprises a first layer of a fluorine-containing polymer having cation exchange groups and reinforced with a porous base material, and a second layer of a fluorine-containing polymer having carboxylic acid groups, present on the cathode side of the first layer, wherein at least ½ of the thickness of the porous base material protrudes from the first layer towards the anode side, the protrusions of the porous base material are covered with a coating layer of a fluorine-containing polymer having cation exchange groups so that the coating layer is integrated or united with the first layer, and the anode side surface of the coating layer has a roughness corresponding to the surface contour of the porous base material.

Figure 1:
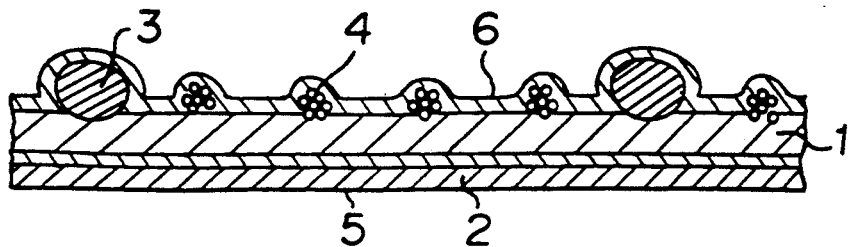
FIG. 1 is a diagrammatic partial cross section of the fluorine-containing cation exchange membrane of Example 1 of the present invention.
Figure 2:
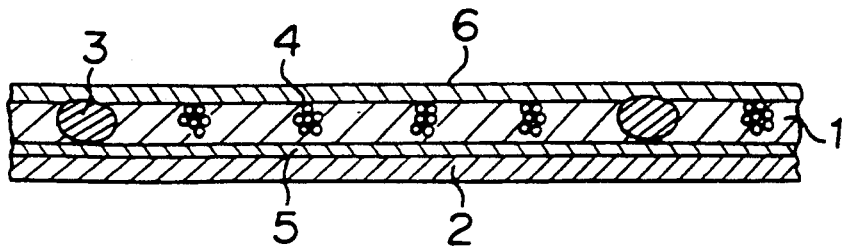
FIG. 2 is a diagrammatic partial cross section of the fluorine-containing cation exchange membrane of Comparative Example 1.
Figure 3:
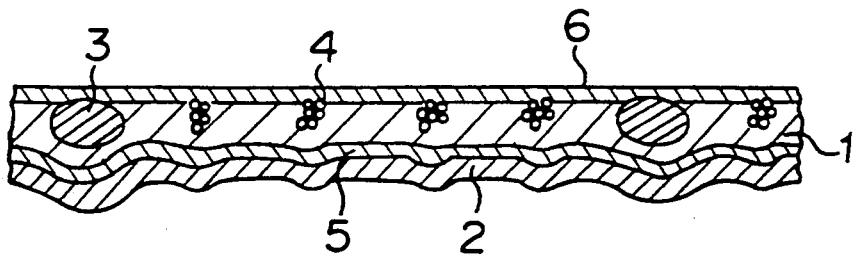
FIG. 3 is a diagrammatic partial cross section of the fluorine-containing cation exchange membrane of Comparative Example 2.
Figure 4:
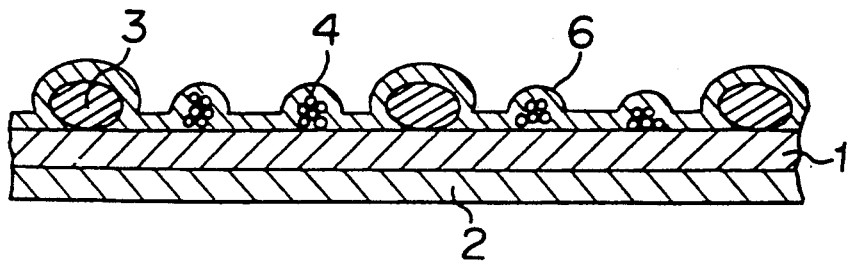
FIG. 4 is a diagrammatic partial cross section of the fluorine-containing cation exchange membrane of Example 3 of the present invention.

In these Figures, reference numeral 1 indicates a first layer, numeral 2 indicates a second layer, numeral 3 indicates a polytetrafluoroethylene yarn, numeral 4 indicates a polyethyleneterephthalate yarn, numeral 5 indicates a third layer, and numeral 6 indicates a coating layer.

DETAILED DESCRIPTION OF THE PREFERRED EMBODIMENTS

Now, the present invention will be described in detail with reference to the preferred embodiments.

As mentioned above, the present invention has a feature that at least ½, preferably at least ¾, of the thickness of the porous base material protrudes towards the anode side from the first layer constituting the cation exchange membrane. It has been unexpected that by such a construction, it is possible to obtain adequate mechanical strength, especially higher bending strength than ever. It has been found that by employing such a novel structure, the current shielding effect by the porous base material can be reduced, and since the membrane thickness can be made thin, the electric resistance of the membrane can accordingly be made very low.

The porous base material to be used in the present invention is preferably made of a woven fabric, a non-woven fabric or a knitted fabric, and the porosity is preferably from 10 to 90%, more preferably from 30 to 80%. In the present invention, a woven fabric is preferably employed as the porous base material, and the yarn fineness is usually from 10 to 300 denier, preferably from 50 to 200 denier, and the yarn density is usually at least 2 yarns/inch, preferably from 6 to 40 yarns/inch. The thickness of such a woven fabric or a knitted fabric is usually from 30 to 250 μm, preferably from 50 to 150 μm.

The woven fabric or the knitted fabric constituting the porous base material preferably has heat resistance and chemical resistance to maintain high levels of the mechanical strength and the dimensional stability from the viewpoint of electrolysis. As an example of such a material, a fluorine-containing polymer such as polytetrafluoroethylene (PTFE), a tetrafluoroethylene-perfluoroalkyl vinyl ether copolymer, a tetrafluoroethylene-hexafluoropropylene copolymer, a tetrafloroethylene-ethylene copolymer, a trifluorochloroethylene-ethylene copolymer or a vinylidene fluoride polymer may be mentioned. Among them, a perfluoropolymer is preferred.

The woven fabric or the knitted fabric as the porous base material, may be made of monofilaments or multifilaments, or twist yarns thereof or slit yarns. As the weaving method, a suitable weaving method such as plain weave, leno weave, knitting, cord weave or shirsaccha, may be employed. For such a woven fabric or a knitted fabric, an intermingled yarn or a mixed fabric of the above described fluorine-containing polymer yarn with a yarn soluble under electrolysis, such as rayon, polyethyleneterephthalate, cellulose or polyamide, may be employed. In such a case, the blending amount of the soluble yarn is preferably from 6 to 95% by weight, more preferably from 30 to 60% by weight, to the total amount.

For the woven fabric or the knitted fabric, a so-called flat cloth wherein the constituting yarn is flattened so that the aspect ratio (i.e. the ratio of the larger diameter to the smaller diameter) of the cross section of the yarn is preferably from 2 to 10, as disclosed in Japanese Unexamined Patent Publication No. 37187/1983, may also be employed.

As the thickness of the fluorine-containing cation exchange membrane of the present invention, a thickness of up to 300 μm, may be employed. However, in the present invention, a thickness of from 30 to 150 μm is preferably employed. According to the present invention, it is possible to obtain a low membrane resistance and excellent mechanical strength and electrochemical properties simultaneously even with such a thin thickness.

The first layer constituting the fluorine-containing cation exchange membrane of the present invention, is made of a fluorine-containing polymer film which preferably has sulfonic acid groups, carboxylic acid groups, or sulfonic acid groups and carboxylic acid groups, as the cation exchange groups and which has a specific resistance lower than the second layer, preferably at a level of from 20 to 200 Ω.cm, more preferably from 30 to 150 Ω.cm (as measured in a 12 wt % NaOH aqueous solution at 25° C.) and a thickness of from 20 to 230 μm, preferably from 30 to 100 μm.

The fluorine-containing polymer for the first layer may not necessarily be made of a single polymer and may be made of two or more fluorine-containing polymers having different cation exchange groups and/or ion exchange capacities, as the case requires. For example, the first layer may be a blend layer or laminated layers of a fluorine-containing polymer having carboxylic acid groups and a fluorine-containing polymer having sulfonic acid groups, or may be a blend layer or laminated layers of two or more fluorine-containing polymers having different ion exchange capacities, while each polymer has sulfonic acid groups or carboxylic acid groups.

On the other hand, the second layer constituting the cation exchange membrane of the present invention is required to have carboxylic acid groups as the cation exchange groups to present a high current efficiency, and its ion exchange capacity is preferably from 0.5 to 2.0 meq/g dry resin, more preferably from 0.8 to 1.3 meq/g dry resin. This second layer has a specific resistance higher than the first layer, at a level of from 180 to 300 Ω.cm, and it is made of a fluorine-containing polymer film preferably having a thickness of from 5 to 70 μm, more preferably from 15 to 50 μm.

In a case where a film of a fluorine-containing polymer having sulfonic acid groups, is used as the first layer in the cation exchange membrane of the present invention, a third layer having preferably a thickness of from 5 to 50 μm, more preferably from 10 to 40 μm, which may be a layer of a fluorine-containing polymer having both sulfonic acid groups and carboxylic acid groups, or a blend layer of a fluorine-containing polymer having sulfonic acid groups and a fluorine-containing polymer having carboxylic acid groups, may be interposed between the first and second layers to improve the adhesion between them, as the case requires.

Further, in a case where the first layer is made of a fluorine-containing polymer film having sulfonic acid groups and carboxylic acid groups, a third layer of a fluorine-containing polymer having carboxylic acid groups and having the adhesion with the first layer improved, may be interposed to improve the adhesion between the first and second layers as in the above case.

Each of the first layer, the second layer and the third layer which may be provided as the case requires, is made of a fluorine-containing polymer, which is a copolymer of at least two monomers, preferably a copolymer having the following polymerization units (a) and (b):

$$-(-CF_2-CXX'-)- \quad (a)$$

$$-\{CF_2-CX(Y-A)\}- \quad (b)$$

In the above formulas, each of X and X' is —F, —Cl, —H or —CF$_3$, and A is —SO$_3$M or —COOM wherein M is hydrogen, an alkali metal or a group which can be converted to such a group by hydrolysis, Y is selected from the following:

in which each of Z and Z' is —F or a C$_{1-10}$ perfluoroalkyl group, and each of x, y and z is an integer of from 1 to 10.

The molar ratio of units (a)/(b) constituting the above polymer is selected so that the fluorine-containing polymer has the above-mentioned ion exchange capacity.

The above fluorine-containing polymer is preferably a perfluoropolymer. Preferred examples are a copolymer of CF$_2$=CF$_2$ with CF$_2$=CFOCF$_2$CF(CF$_3$)OCF$_2$CF$_2$SO$_2$F, a copolymer of CF$_2$=CF$_2$ with CF$_2$=CFO(CF$_2$)$_{3-5}$SO$_2$F, a copolymer of CF$_2$=CF$_2$ with $CF_2=CFO(CF_2)_{1.5}COOCH_3$ and a copolymer of $CF_2=CF_2$ with $CF_2=CFOCF_2CF(CF_3)OCF_2CF_2COOCH_3$.

To reinforce the fluorine-containing polymer film of the first layer with the porous base material in the present invention, the porous base material is overlaid on the fluorine-containing polymer film of the first layer, followed by press-embedding. In the present invention, the cation exchange membrane is composed of a plurality of layers. Namely, the porous base material, the first layer, the third layer as the case requires and the second layer are overlaid in this order, followed by heat press-bonding. The overlaid assembly is pressed under a pressure of from 1 to 80 kg/cm² under heating at a temperature of at least the softening temperature of the fluorine-containing polymer, preferably at least the melting point the fluorine-containing polymer, such as from 100° to 250° C., whereby the porous base material is partially embedded into the fluorine-containing polymer film of the first layer.

In the present invention, it is important that the porous base material is not entirely embedded into the fluorine-containing polymer film of the first layer. Namely, the preferably ½, more preferably ¾ of its thickness, or in an extreme case its entirety, is exposed from the first layer. It has been unexpected that even in such a case, high mechanical strength (especially high bending strength) can be attained by the porous base material.

Further, in the present invention, the porous base material protruded from the fluorine-containing polymer film of the first layer, is covered with a coating layer made of a fluorine-containing polymer film having cation exchange groups so that the coating layer will be integrated with the first layer. This can be attained by overlaying a coating fluorine-containing polymer film substantially over the entire surface of the protrusions of the porous base material and heat press-bonding the entire assembly in the same manner as described above.

The fluorine-containing polymer film to be used for coating is made preferably of the same fluorine-containing polymer having sulfonic acid groups or carboxylic acid groups or the same fluorine-containing polymer having sulfonic acid groups and carboxylic acid group, as the fluorine-containing polymer film having cation exchange groups constituting the first layer, and its thickness is preferably from 5 to 50 μm, more preferably from 10 to 30 μm, for adequate integration of the porous base material with the fluorine-containing polymer of the first layer.

The ion exchange capacity of the fluorine-containing polymer of the coating layer is preferably selected within the same range of the ion exchange capacity of the fluorine-containing polymer of the first layer. Such a fluorine-containing polymer film is coated to cover the protrusions of the porous base material so that the coating layer will be integrated or united with the first fluorine-containing polymer, whereby the anode side surface of the coating layer, i.e. the anode side surface of the cation exchange membrane, will have a roughness (a concave-convex shape) corresponding to the surface contour of the porous base material, as shown by its cross section in FIG. 1. Such a roughness comprises concaves corresponding to the pore portions of the porous base material and convexes corresponding to the backbone portions of the porous base material. In the case of a woven fabric as a typical porous base material, weaving yarns form the convexes and the open or spaces between weaving yarns form the concaves.

The roughness of the anode surface of the cation exchange membrane is determined by the porosity of the porous base material i.e. by the yarn fineness and the yarn density in the case of a woven fabric. In the present invention, the roughness is suitably controlled by selecting the porosity of the porous base material, or the yarn fineness and the yarn density in the case of a woven fabric, within the above mentioned preferred range.

The fluorine-containing cation exchange membrane of the present invention may be used as it is. However, it is preferred to apply treatment for releasing chlorine gas, to at least one surface of the cation exchange membrane, particularly preferably at least the anode side surface of the cation exchange membrane, to further improve the stability of the current efficiency for a long period of time.

Examples of the process for applying gas-releasing treatment to the surface of the ion exchange membrane include a process for forming minute concave-convex patterns on the surface of the membrane (see U.S. Pat. No. 4,468,301), a process for depositing hydrophilic inorganic particles to the surface of the membrane by supplying iron, zirconia or the like dispersed in brine to an anolyte in an electrolytic cell (see U.S. Pat. No. 4,367,126), and a process for providing a non-electrode porous layer on at least one surface of the membrane (see U.S. Pat. Nos. 4,666,574 and 4,652,356). The gas releasing layer on the surface of the ion exchange membrane improves not only the long term stability of current efficiency but also the long term stability of the voltage during electrolysis.

The fluorine-containing cation exchange membrane of the present invention can be used for various electrolyses. For example, when it is used for electrolysis of an aqueous alkali metal chloride solution, known conditions as disclosed in the above mentioned Japanese Unexamined Patent Publication No. 112398/1979 may be employed. For example, a from 2.5 to 5.0N alkali metal chloride aqueous solution is supplied to the anode compartment, and the electrolysis is conducted preferably at a temperature of from 50° to 120° C. at a current density of from 5 to 100 A/dm², optionally by supplying water or dilute alkali metal hydroxide to the cathode compartment. In this case, it is advisable to reduce heavy metal ions such as calcium, magnesium and iodine ions in the alkali metal chloride aqueous solution as much as possible, since these impurities deteriorate the cation exchange membrane.

An electrolytic cell in which the cation exchange membrane of the present invention is used, may be either mono-polar type or bi polar type. In the case of electrolysis of an alkali metal chloride aqueous solution, the material for the electrolytic cell may be valve metal, titanium or the like for the anode compartment, which is resistant to the alkali metal chloride aqueous solution and chlorine, and iron, stainless steel or nickel for the cathode compartment, which is resistant to the alkali metal hydroxide and hydrogen. According to the present invention, when an electrode is placed, the electrode may be placed in contact with the multi-layer membrane or may be placed apart from the membrane. However, in the present invention, even when the electrode is placed in contact with the membrane, an advantageous cell voltage can be achieved with a low membrane resistance without any hindrance.

Now, the present invention will be described in further detail with reference to Examples. However, it should be understood that the present invention is by no means restricted by such specific Examples. In the Examples and Comparative Examples, electrolysis was conducted using an electrolytic cell having an effective current-applied area of 0.25 dm$^2$, wherein the anode was made of a punched metal of titanium having diamond-shaped openings (short diameter: 4 mm, long diameter: 8 mm) coated with a solid solution of ruthenium oxide, iridium oxide and titanium oxide, and the cathode was made of a punched metal of SUS 304 having diamond-shaped openings (short diameter: 4 mm, long diameter: 8 mm) coated with ruthenium-containing Raney nickel by electrodeposition.

The electrolysis was carried out by placing the anode, the membrane and the cathode in contact with one another, supplying a 5N sodium chloride aqueous solution to the anode compartment and water to the cathode compartment, and keeping the concentration of the sodium chloride in the anode compartment at 3.5N and the concentration of sodium hydroxide in the cathode compartment at 35% by weight, at a current density of from 15 to 50 A/dm$^2$ at a temperature of from 75° to 90° C.

EXAMPLE 1

Polytetrafluoroethylene (PTFE) monofilaments prepared by rapidly stretching a PTFE film and then slitting the stretched film in a fineness of 100 denier and multifilaments each prepared by twisting six polyethyleneterephthalate (PET) fibers of 5 denier, were plain-weaved in an alternate arrangement of one PTFE yarn followed by four PET yarns to obtain a reinforcing woven fabric having a yarn density count of 80 yarns/inch. The woven fabric was flattened by means of a roll pressing machine so that the thickness of the woven fabric became about 80 μm.

Then, resin A made of a $CF_2=CF_2/CF_2=CFOCF_2CF_2CF_2CO_2CH_3$ copolymer and having an ion exchange capacity of 1.25 meq/g dry resin, resin B made of the same copolymer and having an ion exchange capacity of 1.44 meq/g dry resin and resin C made of a $CF_2=CF_2/CF_2=CFOCF_2CF(CF_3)OCF_2CF_2SO_2F$ copolymer and having an ion exchange capacity of 1.10 meq/g dry resin, were prepared. The above resins B and C were blended in a weight ratio of 1:1 to obtain resin D.

Then, by a melt-extrusion method, film A having a thickness of 30 μm was formed from resin A, film B having a thickness of 15 μm was formed from resin D, and film C having a thickness of 50 μm and film D having a thickness of 20 μm were formed from resin C. Further, films A, B and C were heat press-bonded in this order to obtain a multi-layered film.

Such a woven fabric and films were overlaid in the order of film D, the woven fabric, the multi-layered film (disposed so that the film C side faced the woven fabric side), and a releasing PET film (100 μm), and the assembly was heated while suctioning air between film D and the multi-layered film by vacuuming, to integrate film D, the woven fabric and the multi-layered film. Then, the releasing PET film was peeled off to obtain a reinforced laminated membrane.

Further, $ZrO_2$ having an average particle size of 5 μm, was dispersed in an amount of 13% by weight to an ethanol solution containing 2.5% by weight of an acid-type polymer of resin C to obtain a dispersion. This dispersion was sprayed on each side of the above laminated membrane to deposit 0.9 mg/cm$^2$ of a gas-releasing coating.

This membrane was hydrolyzed in a 25 wt % NaOH aqueous solution at 70° C. for 16 hours, whereupon the tensile strength, the tensile elongation, the tensile strength and tensile elongation after bending, and the electrolytic performance were measured. The measurement of the tensile strength and the tensile elongation was conducted in accordance with JIS K6732, and bending was conducted by folding the membrane along the PTFE yarn so that the film D side became convex. Electrolysis was conducted at a current density of 50 A/dm$^2$ at a temperature of 90° C. in an electrolytic cell in which the membrane was disposed so that the film D side faced the anode side. The results are shown in Tables 1 and 2 together with the results of Comparative Examples 1 and 2.

TABLE 1

|  | Tensile strength (kg/cm width) | Tensile elongation (%) | After Bending | |
| --- | --- | --- | --- | --- |
|  |  |  | Tensile strength (kg/cm width) | Tensile elongation (%) |
| Example 1 | 3.9 | 37 | 3.8 | 30 |
| Comparative Example 1 | 3.8 | 18 | 2.4 | 5 |
| Comparative Example 2 | 3.6 | 19 | 3.1 | 10 |

TABLE 2

|  | Initial stage | | After 150 days | |
| --- | --- | --- | --- | --- |
|  | Cell voltage (V) | Current efficiency (%) | Cell voltage (V) | Current efficiency (%) |
| Example 1 | 3.05 | 96.7 | 3.05 | 96.4 |
| Comparative Example 1 | 3.22 | 96.2 | 3.24 | 94.8 |
| Comparative Example 2 | 3.15 | 96.3 | 3.15 | 95.3 |

COMPARATIVE EXAMPLE 1

Using the same woven fabric and films as used in Example 1, the releasing PET film, film D, the woven fabric, the multi-layered film (disposed so that the film C side faced the woven fabric side) and the releasing PET film are overlaid in this order and heat press-bonded by a flat plate press. Then, the releasing PET films were peeled off from both sides to obtain a reinforced laminated membrane.

To this laminated membrane, the same gas-releasing coating was deposited in the same manner as in Example 1, and then, the membrane was hydrolyzed in a 25 wt % NaOH aqueous solution at 70° C. for 16 hours, whereupon the mechanical strength and the electrolytic performance were measured under the same conditions as in Example 1.

COMPARATIVE EXAMPLE 2

A membrane was prepared in the same manner as in Example 1 except that the releasing PET film, film D, the woven fabric and the multi-layered film (disposed so that the film C side faced the woven fabric side) were overlaid in this order. The, the mechanical strength and the electric performance were measured under the same conditions as in Example 1.

EXAMPLE 2

Using the membrane prepared in the same manner as in Example 1, the electrolysis was conducted by alternately repeating the two electrolytic conditions of a current density of 15 A/dm$^2$ and a temperature of 75° C. and a current density of 50 A/dm$^2$ and a temperature of 90° C., every other day. The results are shown in Table 3.

TABLE 3

| Operation days | Cell voltage (V)[1] | Current efficiency (%)[2] |
| --- | --- | --- |
| 1–30 | 3.05 | 96.6 |
| 31–70 | 3.05 | 96.4 |
| 71–100 | 3.05 | 96.7 |
| 101–130 | 3.05 | 96.4 |
| 131–170 | 3.05 | 96.5 |
| 171–200 | 3.05 | 96.3 |

[1] Average value at 50 A/dm$^2$
[2] Average value at 15 A/dm$^2$ and 50 A/dm$^2$

EXAMPLE 3

A woven fabric having the same yarn fineness and yarn density as in Example 1 was prepared in the same manner as in Example 1 except that the yarns were alternately arranged so that one PTFE yarn was followed by two PET yarns.

Then, resin E made of a $CF_2=CF_2/CF_2=CFOCF_2CF(CF_3)OCF_2CF_2CO_2CH_3$ copolymer and having an ion exchange capacity of 0.95 meq/g dry resin, was prepared. This resin E and resin C as used in Example 1 were subjected to a double-layered co-extrusion method to obtain a double-layered film having thicknesses of 40 μm and 50 μm, respectively.

Then, film D as used in Example 1, the woven fabric, the double-layered film (disposed so that resin C faces the woven fabric side) and the releasing PET film were overlaid in this order, and the assembly was heated while suctioning air between film D and the double-layered film by vacuuming, to integrate film D, the woven fabric and the double-layered film. Then, the releasing PET film was peeled off to obtain a reinforced laminated membrane.

This membrane was hydrolyzed at 90° C. for one hour using an aqueous solution containing 30% by weight of dimethylsulfoxide and 11% by weight of KOH, followed by washing with water and drying. Then, in the same manner as in Example 1, a gas-releasing coating film was deposited on each side to obtain a membrane for evaluation of the electrolytic properties. Electrolysis was conducted at a current density of 50 A/dm$^2$ at a temperature of 90° C. in an electrolytic cell in which the membrane thus obtained was disposed so that the film D side faced the anode side. The current efficiency was 96.5%, and the cell voltage was 3.06 V.

EXAMPLE 4

Resin F made of a $CF_2=CF_2/CF_2=CFOCF_2CF_2CF_2CO_2CH_3$ copolymer and having an ion exchange capacity of 1.8 meq/g dry resin, was prepared. This resin and resin C of Example 1 were blended in a weight ratio of 1:1 to obtain resin G.

Then, films E and F having thicknesses of 40 μm and 20 μm, respectively, were formed from resins A and B as used in Example 1, and film G having a thickness of 30 μm was formed from resin G, by a melt-extrusion method. Further, films E, F and G were heat press-bonded in this order to obtain a multi-layered film.

The multi-layered film thus obtained and film D and the woven fabric as used in Example 1 were overlaid in the order of film D, the woven fabric, the multi-layered film (disposed so that the film G side faced the woven fabric side) and the releasing PET film and integrated in the same manner as in Example 1 to obtain a reinforced laminated membrane. Then, to this laminated membrane, a gas-releasing coating film was deposited in the same manner as in Example 1. Then, it was hydrolyzed at 70° C. for 16 hours in a 25 wt % NaOH aqueous solution to obtain a membrane for evaluation of the electrolytic performance.

Electrolysis was conducted in an electrolytic cell in which the membrane thus obtained was disposed so that the film D side faced the anode side. The results are shown in Table 4.

TABLE 4

| Operation days | Current density (A/dm$^2$) | Temp. (°C.) | Cell voltage (V) | Current efficiency (%) |
| --- | --- | --- | --- | --- |
| 1–20 | 30 | 85 | 2.90 | 97.1 |
| 21–40 | 15 | 75 | 2.83 | 96.5 |
| 41–60 | 30 | 90 | 2.85 | 96.7 |
| 61–80 | 50 | 90 | 3.06 | 96.4 |
| 81–100 | 50 | 85 | 3.11 | 96.6 |
| 101–120 | 30 | 75 | 3.00 | 96.5 |

The fluorine-containing cation exchange membrane for electrolysis of the present invention has not only high mechanical strength (especially against bending during its use) but also excellent electrochemical properties i.e. a low electric resistance and high current efficiency.

Further, the fluorine-containing cation exchange membrane for electrolysis of the present invention provides such excellent performance even in the case of electrolysis at a high current density, whereby shift operation wherein the current density is substantially varied, can be conducted, and the costs for electrolysis can be reduced to a large extent by utilizing the difference in the power cost between the day time and the night time.

The fluorine-containing cation exchange membrane of the present invention can advantageously be used for various electrolyses including an alkali metal chloride electrolysis utilizing the above merits.

What is claimed is:

1. A fluorine-containing cation exchange membrane for electrolysis, which comprises a first layer of a fluorine-containing polymer having cation exchange groups and reinforced on one side with a porous base material having a surface contour and a second layer of a fluorine-containing polymer having carboxylic acid groups present on a side of the first layer opposite the side of the porous base material, wherein at least ½ of the thickness of the porous base material protrudes to form a protrusions from the first layer towards the side opposite the second layer, the protrusions of the porous base material are covered with a coating layer of a fluorine-containing polymer having cation exchange groups so that the coating layer is integrated with the first layer, the coating layer having an exposed surface opposite the second layer which exposed surface has a roughness corresponding to the surface contour of the porous base material.

2. The fluorine-containing cation exchange membrane according to claim 1, wherein the porous base material is a woven fabric made of fluorine-containing polymer yarns having a fineness of from 10 to 300 denier and having a yarn density of from 2 to 100 yarn/inch and a thickness of from 30 to 250 μm.

3. The fluorine-containing cation exchange membrane according to claim 1, wherein the first layer is made of a fluorine-containing polymer film having carboxylic acid groups, sulfonic acid groups, or carboxylic acid groups and sulfonic acid groups, as the cation exchange groups and having a specific resistance of from 20 to 200 Ω.cm and a thickness of from 20 to 230 μm.

4. The fluorine-containing cation exchange membrane according to claim 1, wherein the second layer is made of a fluorine-containing polymer film having a thickness of from 5 to 70 μm and a specific resistance higher than the first layer.

5. The fluorine-containing cation exchange membrane according to claim 1, wherein the coating layer of a fluorine-containing polymer having cation exchange groups is made of a fluorine-containing polymer film having a thickness of from 5 to 50 μm and having sulfonic acid groups.

6. The fluorine-containing cation exchange membrane according to claim 1, wherein the first layer is made of a fluorine-containing polymer film having sulfonic acid groups, and a third layer made of a fluorine-containing polymer film having sulfonic acid groups and carboxylic acid groups, is interposed between the first and second layers.

7. The fluorine-containing cation exchange membrane according to claim 1, wherein the first layer is made of a fluorine-containing polymer film having sulfonic acid groups and carboxylic acid groups, and a third layer made of a fluorine-containing polymer film having carboxylic acid groups, is interposed between the first and second layers.

8. The fluorine-containing cation exchange membrane according to claim 1, wherein at least ⅔ of the thickness of the porous base material protrudes from the first layer towards the side opposite the second layer.

9. The fluorine-containing cation exchange membrane according to claim 1, wherein a layer for releasing a gas formed by electrolysis, is provided on the exposed side of the coating layer, or on an exposed side of the second layer, or on both of these sides.

10. The fluorine-containing cation exchange membrane according to claim 1, wherein the electrolysis is an alkali metal chloride electrolysis to produce an alkali metal hydroxide and chlorine.

* * * * *